(12) United States Patent
Schick et al.

(10) Patent No.: US 11,797,086 B2
(45) Date of Patent: Oct. 24, 2023

(54) WEARABLE FINGER TAP DETECTION SYSTEM WITH LOW POWER MODE

(71) Applicant: Tap Systems Inc., Los Angeles, CA (US)

(72) Inventors: David B. Schick, Los Angeles, CA (US); Liron Ilouz, Aley Zahav (IL)

(73) Assignee: Tap Systems Inc., Los Angeles, CA (US)

(*) Notice: Subject to any disclaimer, the term of this patent is extended or adjusted under 35 U.S.C. 154(b) by 7 days.

(21) Appl. No.: 17/224,177

(22) Filed: Apr. 7, 2021

(65) Prior Publication Data

US 2021/0342002 A1  Nov. 4, 2021

Related U.S. Application Data

(60) Provisional application No. 63/017,784, filed on Apr. 30, 2020.

(51) Int. Cl.
| | | |
|---|---|---|
| *G06F 3/01* | (2006.01) | |
| *G06F 3/02* | (2006.01) | |
| *G06F 3/041* | (2006.01) | |
| *G06F 1/3231* | (2019.01) | |
| *G06F 3/023* | (2006.01) | |

(52) U.S. Cl.
CPC ............ *G06F 3/014* (2013.01); *G06F 1/3231* (2013.01); *G06F 3/0219* (2013.01); *G06F 3/0235* (2013.01); *G06F 3/04144* (2019.05); *G06F 2203/04104* (2013.01)

(58) Field of Classification Search
CPC .... G06F 3/04144; G06F 3/0219; G06F 3/017; G06F 3/015; G06F 3/0304; G06F 3/0235; G06F 3/0426; G06F 3/014; G06F 1/163; G06F 2203/04104; Y02D 10/00
See application file for complete search history.

(56) References Cited

U.S. PATENT DOCUMENTS 9,229,526 B1 * 1/2016 Neglur .................. G06F 3/0304
10,599,216 B2   3/2020 Schick
(Continued)

OTHER PUBLICATIONS

International Search Report and Written Opinion dated Jul. 9, 2021 in corresponding PCT Appln. No. PCT/US2021/028328.

*Primary Examiner* — Priyank J Shah
(74) *Attorney, Agent, or Firm* — Venable LLP

(57) ABSTRACT

A method of controlling a wearable tap detection system having a processor and a plurality of sensors for detecting contact by one or more fingers against a surface, including at least one mechanical sensor, includes detecting, as a tap event, a signal from the at least one mechanical sensor that exceeds a predetermined threshold. When the tap event is detected, the processor is switched from a first power mode to a second power mode, the second power mode using more power than the first power mode. Then, using the processor in the second power mode, processing of one or more signals from the plurality of sensors is performed to generate processed signal data. After the processed signal data is generated, the processor is switched from the second power mode to the first power mode. Then, while in the first power mode that uses less power, the processor analyzes the processed signal data to determine one of a character or a command that corresponds to the fingers that contacted the surface at the time of the tap event.

32 Claims, 11 Drawing Sheets

(56) References Cited

U.S. PATENT DOCUMENTS

| | | | |
|---|---|---|---|
| 2013/0120250 A1* | 5/2013 | Lin | G06F 3/017 |
| | | | 345/157 |
| 2014/0149754 A1 | 5/2014 | Silva | |
| 2018/0032248 A1* | 2/2018 | Kim | G06F 3/0446 |
| 2019/0354226 A1* | 11/2019 | Choi | G06F 21/32 |
| 2020/0026342 A1* | 1/2020 | Sengupta | G06F 1/1686 |
| 2020/0073483 A1 | 3/2020 | Berenzweig | |
| 2022/0229188 A1* | 7/2022 | Klug | G06F 3/017 |

* cited by examiner

WEARABLE FINGER TAP DETECTION SYSTEM WITH LOW POWER MODE

CROSS-REFERENCE TO RELATED APPLICATION

This application claims priority to U.S. Provisional Application No. 63/017,784, filed on Apr. 30, 2020.

BACKGROUND

Field

Example aspects described herein relate generally to chorded data entry systems, and more particularly to an arbitrary surface and finger position keyboard, i.e., a finger tap detection system.

Description of Related Art

Prior inventions have disclosed an Arbitrary Surface and Finger Position Keyboard in which the user inputs information by tapping their fingers on any surface. Examples of a finger tap detection system in which the fingers can be tapped on an arbitrary surface may be found, for example, in U.S. Pat. No. 10,599,216. The system disclosed in that patent allows the operator to tap on any surface, with the fingers arranged in any position. Neither the fingers nor the fingertips of the operator need to be aimed at any target. As a result, the system described therein reduces finger travel and facilitates much faster and more accurate data entry than prior systems.

In some embodiments, the finger taps are detected by a wrist-worn camera (that is, some type of image sensor to capture images), which may operate in conjunction with a processor and, in some embodiments, with a mechanical sensor such as an accelerometer. When the mechanical sensor detects that a tap event has occurred, the processor examines the images captured by the camera to determine which fingers make contact with the surface during the tap event, and which ones do not. The processor then transmits this data to a host device by means such as Bluetooth®. (In various embodiments, it is possible to transmit raw data, to transmit the results of analysis that indicate which fingers made contact, or to transmit other information obtained by mapping the fingers that made contact to the other information.)

Generally, the data contained in the images that are captured by such a camera can be characterized as consisting of 1) fingers, 2) a surface, and 3) background. Each pixel in the image must belong to one of these groups. In classical image processing, an algorithm would typically extract the edges of the objects in the image, and then use a priori knowledge about the morphology of these objects to determine where the objects are positioned in the image. Once this is done, an algorithm can determine when the fingers are in contact with the surface. This approach works well when the image is obtained under ideal conditions—that is, the fingers are well illuminated, the surface is flat and has a consistent color and texture, and the background does not have significant complexity. However, when the illumination is not ideal, or when the surface is patterned or textured, or when the background has many objects, it is very difficult for such a method to extract finger tap data with sufficient accuracy to be useful.

It should be noted that modern keyboards and input devices typically have very close to 100% accuracy. Therefore, a device that replaces the use of traditional input devices must be highly accurate. This task is complicated because, for each tap to be detected properly, all five fingers must be accurately detected. Thus, the accuracy challenge is multiplied by five—even a 1% error rate for finger detection will translate to a 5% error rate for tap detection.

In order to improve detection accuracy, several methods may be employed. One such method uses three-dimensional imaging techniques to extract depth data from the image. This is highly desirable because, once depth data is known, it is possible to locate the fingers, the surface and the background with great accuracy, even under non-ideal circumstances.

There are several well-known methods to obtain depth data from images. These include structured light projection, stereo imaging, time of flight analysis and other methods.

While all of these methods can be applied to a tap-based data entry system, all of them require several orders of magnitude more power than do the classical methods of image processing, such as, for example, those using edge detection for finger tracking. Such 3-D processing is widely available, and is employed in many computationally intensive applications such as image rendering, data decryption, and computer vision; however, such processing requires a large amount of electrical power compared to classical image processing methods. For example, a low-powered processor that could perform the necessary operations for classical image processing may consume 10 mW of power, while a processor which is capable of extracting a depth map may consume 1 W of power (that is, 100 times as much power).

These high-power processors can take many forms. The most common are Graphics Processing Units (GPU's), which can perform several trillion operations per second. More generally, high-power processors can be customized to perform a specific, computationally-intensive task. Such a component may be referred to herein as an Application Specific Integrated Circuit (ASIC), but one of ordinary skill in the art will understand that this component can be a pre-made, off-the-shelf device or a custom integrated circuit, so long as it is designed to perform a computationally-complex task.

These ASICs are not suitable for a wearable device for two reasons. First, in order for the device to be practical, it must be able to be used for an extended period of time (for example, a full work day) without requiring that the battery be recharged. If the power consumption is high, as would be the case for a processor capable of performing the desired 3-D processing, the size of the resulting battery would be too large to be usable in a wearable device. Second, the heat that such a device would produce would make it uncomfortable or impossible to be worn.

SUMMARY

A system according to example embodiments disclosed herein allows the use of ASICs, in a wearable tap detection device, capable of three dimensional and other advanced processing methods. The system uses the information from a mechanical sensor to determine when a tap event takes place, and therefore it can maintain all or most of the ASIC in a low power sleep state except when a tap is being processed. By significantly reducing the duty cycle of the ASIC, the required power and the amount of generated heat are managed at levels that permit a practical wearable tap system that can perform three dimensional or other advanced processing.

In one embodiment the data entry system can also include a wearable structure constructed to support the sensor apparatus (i.e., a mechanical sensor and/or an image sensor) on any one of i) a dorsal surface of a hand ii) a palmar surface of a hand, iii) a wrist, and iv) phalanges of a hand, or any combination of i), ii), iii) and iv).

The data entry system may also include a processor, communicatively coupled to the sensor apparatus, operable to filter the image to ascertain a location of each finger at the moment of contact against the arbitrary surface.

BRIEF DESCRIPTION OF THE DRAWINGS

The features and advantages of the example embodiments presented herein will become more apparent from the detailed description set forth below when taken in conjunction with the drawings.

DETAILED DESCRIPTION

The example embodiments of the invention presented herein are directed to methods, systems and computer program products for a chorded data entry system that enable an operator to tap a combination of fingers on an arbitrary surface thereby causing a character or command to be entered in an electronic device, which are now described herein in terms of example one-handed chorded data entry systems. This description is not intended to limit the application of the example embodiments presented herein to one-handed use cases. In fact, after reading the following description it will be apparent to one skilled in the relevant art(s) how to implement all of the following example embodiments using a pair of the chorded data entry systems for use with an operator's left hand, right hand, or a combination of both. In addition, the term "finger combination" as used herein refers to any one finger or a combination of fingers.

The example chorded data systems described herein allow an operator's fingers to be arranged in any position and neither the fingers nor their fingertips need be aimed at any particular target. As a result, the system reduces finger travel and facilitates fast and accurate data entry. In addition, the system enables a user to enter characters or commands into a computing device by tapping a combination of fingers on any surface. Furthermore, according to an example embodiment having a low power mode, it is possible to provide a wearable device that can perform complex image processing without requiring impractical power requirements.

Figure 1:
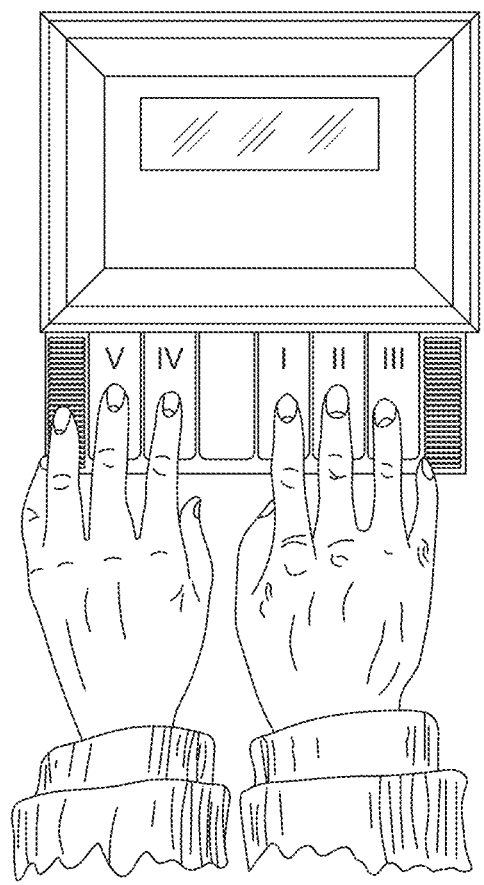
FIG. 1 illustrates an example of a Baudot Keyboard.
Figure 2:
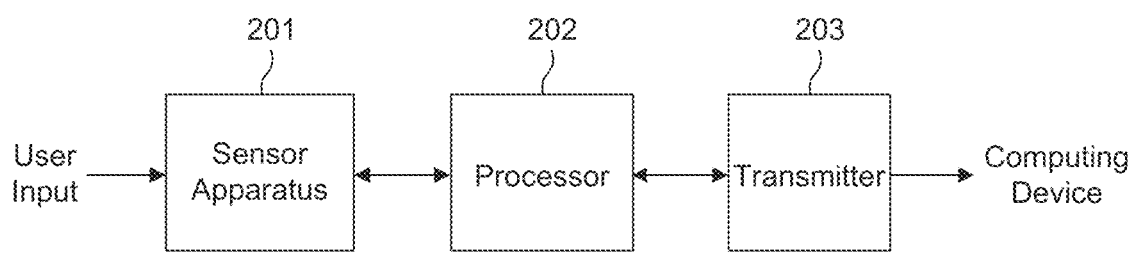
FIG. 2 illustrates an example system that may be employed in accordance with various example aspects herein.

FIG. 2 illustrates an example system 200 that may be employed in accordance with various example aspects. System 200 includes a sensor apparatus 201 that is coupled to a processor 202 which in turn is coupled to a transmitter 203. In some example implementations, sensor apparatus 201 operates as does a camera to the extent it can detect and convey information that constitutes an image of an object. In this implementation, the objects are fingers of a hand and a surface that the fingertips or substantially the fingertips of the fingers contact. The sensor apparatus is arranged to have the fingers in its field of view. Accordingly, the sensor apparatus 201 may be considered a special purpose camera or a camera that has been purposed and arranged for the particular applications described herein. For simplicity, in this embodiment the terms "sensor apparatus 201" and "special purpose camera" may be used interchangeably herein. The term "image sensor" can also encompass such a special purpose camera.

Particularly, sensor apparatus 201 may be integrated into a wearable structure such that the sensor apparatus 201 is located at the bottom of a wrist or palm of a user (also commonly referred to as the dorsal surface of a hand or palmar surface of a hand, respectively). In this embodiment, sensor apparatus 201 is arranged in a manner that allows all of the fingertips of the user to be within its field of view. The other components of system 200 including the processor 202 and transmitter 203 can be located elsewhere or inside on the housing or structure supporting the sensor apparatus 201.

In one embodiment, as sensor apparatus 201 captures finger combinations being used with each tap, processor 202 performs instructions which cause the sensed finger combination to be mapped to an appropriate character or command. The transmitter 203 then transmits the mapped or decoded character to a computing device via a wireless or wired interface.

Instead of determining finger combinations within system 200 by processor 202, in an alternative embodiment, processor 202 causes the image data obtained from the sensor apparatus 201 to be transmitted to the computing device for further processing (i.e., to process and filter the images, determine sensed finger combinations and map the sensed finger combinations to the appropriate character) via a wireless or wired interface. This would allow, for example, for the processing device of the computing device (e.g., in a smartphone or other computing device) to determine which fingertips were in contact with a surface during the tap, and which were not. Such an arrangement can reduce the complexity and power requirement of processor 202.

In yet another alternative embodiment, processor 202 performs some processing on the captured finger combinations, such as by performing edge detection filtering and landmark identification from the image data acquired by the sensor apparatus 201, and then forwarding the partially processed data through the transmitter to the computing device via a wireless or wired interface for further processing by the computing device and identification of the tapped finger combination.

The sensor apparatus 201 need only detect which fingers are in contact with the surface at the time of the tap, thereby allowing the user to tap on any surface, with fingers arranged in any position. The user need not aim at a specific key or location, or start the tap from a specific point (unlike in a gesture-based system), thus making the data entry process fast and reliable. Also, system 200 is mobile because tapping can be done on any surface, such as a table, a leg of the user, a chair, and/or the like.

Sensor apparatus 201 may optionally include a module, such as a mechanical sensor (e.g. accelerometers, vibration sensors, tactile sensors, force sensors, pressure sensors, gyroscopes, and the like; not shown), for sensing when a tap occurs (i.e., when any of the fingers of the hand have generated an acceleration, vibration, pressure or force indicative that they have made contact with a surface). In an example embodiment, processor 202 senses that a tap has occurred by reading a signal from the mechanical sensor, at which point the sensor apparatus 201 captures an image (or a series of images), and the processor 202 determines which fingertips were in contact with a surface during the tap, and which were not. The optional mechanical sensor can be located within the same housing as the sensor apparatus 201.

In an example embodiment of this optional arrangement, system 200 monitors the outputs of the mechanical sensor to determine whether a tap (e.g., a contact of a finger with a surface) has occurred. The beginning of a tap event, in this situation, is indicated by a change in output from one or more mechanical sensors above a predetermined threshold. Once a tap is sensed, processor 202 causes an image sensor (discussed in more detail below) to capture image(s). In this embodiment, the mechanical sensor can be located anywhere on the hand or wrist that allows the mechanical sensor to sense mechanical quantities of any of the fingers used for tapping. For example, the mechanical sensor can be arranged to be located on the back of the wrist or hand, the palm, or on, for example, the proximal phalanges. Upon sensing a contact with a surface (i.e., a tap), the mechanical sensor generates mechanical quantities in the form of a signal capable of being processed (e.g., compared against a threshold) by processor 202.

Figure 3:
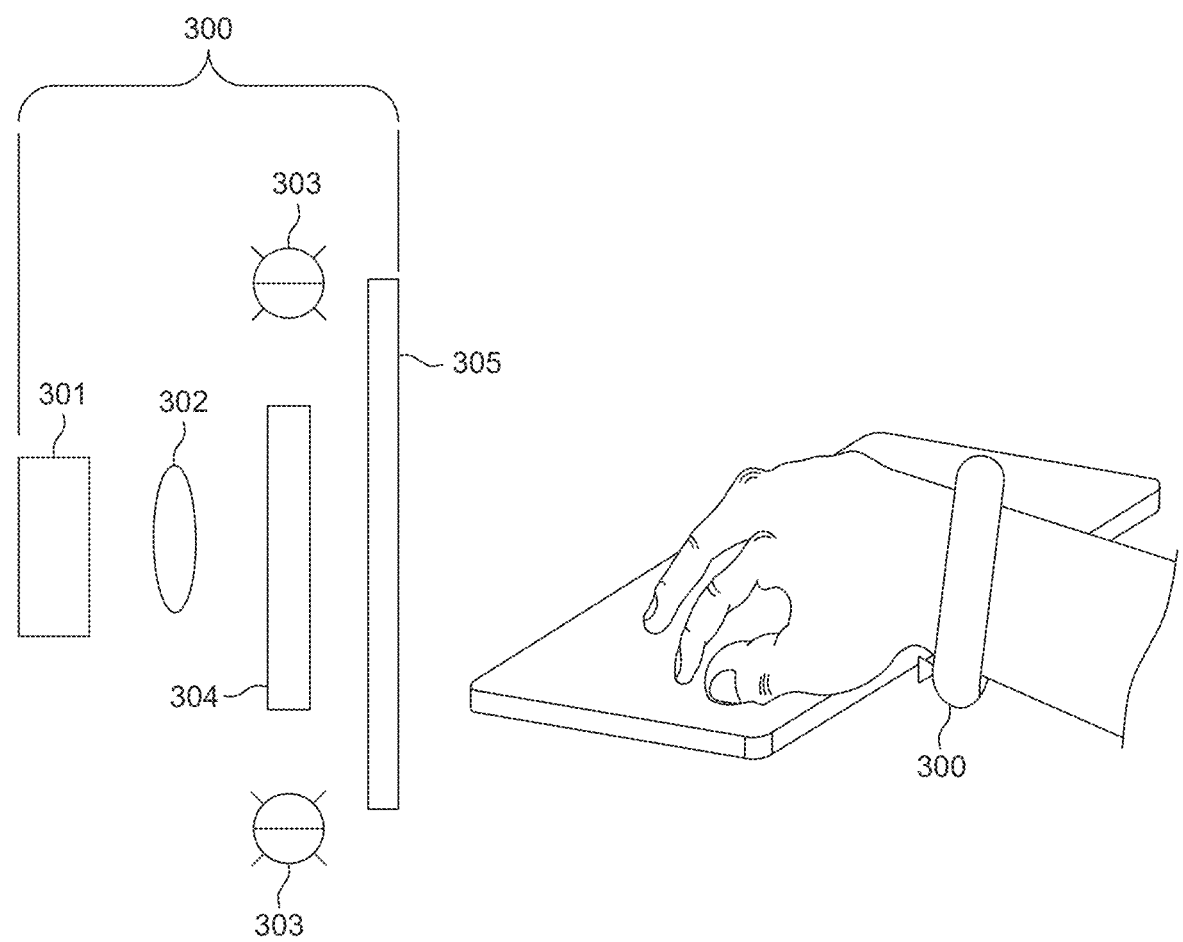
FIG. 3 illustrates an example of a camera-based sensor apparatus.

FIG. 3 illustrates an example camera-based sensor apparatus 300, or special purpose camera, which, in some example embodiments may further represent the sensor apparatus 201 that is described above in connection with FIG. 2. In one embodiment, sensor apparatus 300 includes an image sensor 301 which is sensitive to light in the near infrared spectrum, with associated drive electronics and image processing means (not shown), and a wide angle lens 302 arranged such that all five fingers are in its field of view. The image sensor 301 generates a signal representative of the image it captures.

Sensor apparatus 300 can also include an optical illumination system including one or more infrared light emitting diodes (IR LEDs) 303 which are strobed. In one embodiment, IR LEDs 303 are strobed in synchronization with the image sensor 301 or are illuminated whenever the device is turned on. In another embodiment IR LEDs 303 are strobed when a tap is detected.

An optical filter 304 is situated in front of image sensor 301 to prevent light having wavelengths that are below the infrared spectrum (e.g. 800 nm) from impinging on image sensor 301. Sensor apparatus 300 may also include a polarizing filter 305 placed in front of the IR LEDs 303 and lens 302, thus reducing the amount of ambient light that reaches the image sensor 301.

In this example implementation, as shown in FIG. 3, sensor apparatus 300 is implemented by attaching at least the sensor apparatus 300 to the bottom of a wrist of a user, arranged in a manner such that all of the fingertips of the user are within its field of view. As noted above in connection with FIG. 2, sensor apparatus 300 also can be implemented at other locations, such as by locating the sensor apparatus 300 at the bottom of a palm of a user.

Figure 4:
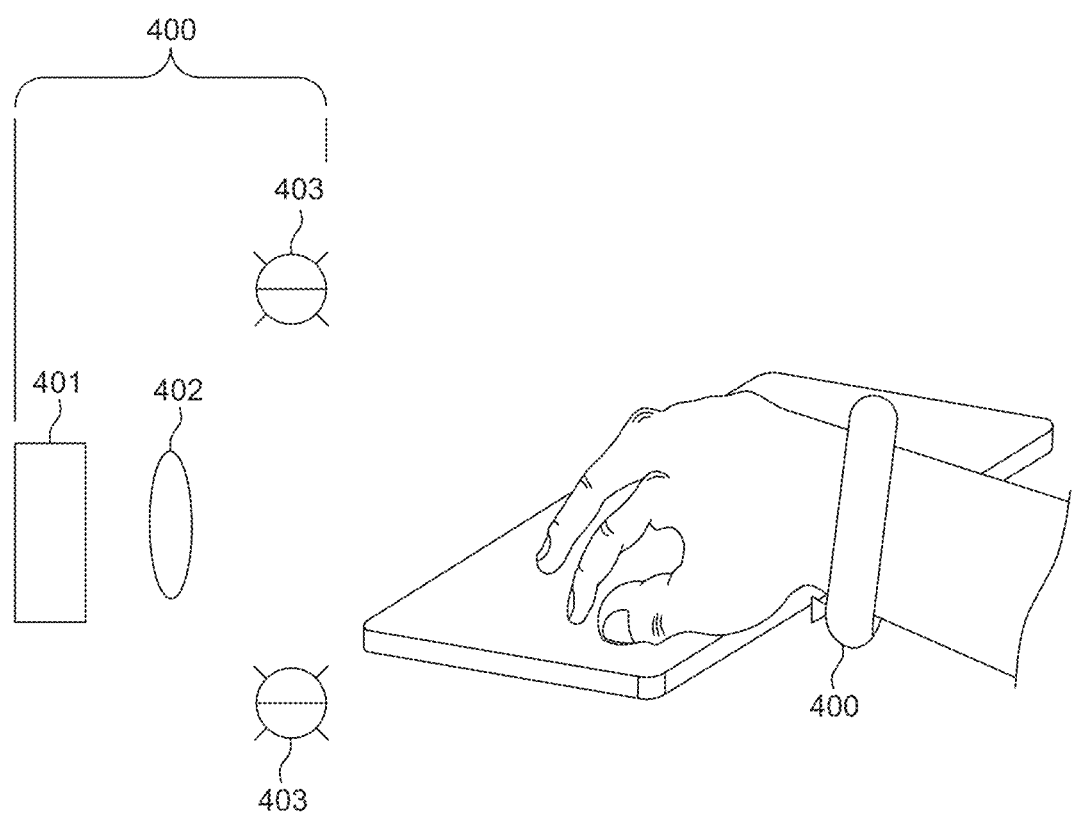
FIG. 4 illustrates another example of a camera-based sensor apparatus.

Referring to FIG. 4, in another embodiment, the optical illumination system can operate in the visible light spectrum (e.g., 400-700 nm). This embodiment is similar to the above described IR embodiments; however the illumination system emits light in the visible spectrum instead of the infrared spectrum. FIG. 4 illustrates an example camera-based sensor apparatus 400, or special purposed camera, which, in some example embodiments may further represent the sensor apparatus 201 that is described above in connection with FIG. 2. In this embodiment, the sensor apparatus 400 includes an image sensor 401 which is sensitive to light in the visible spectrum, with associated drive electronics and image processing means (not shown), and a wide angle lens 402 arranged such that all five fingers will be in its field of view. Sensor apparatus 400 can also include an optical illumination system. The illumination system includes one or more visible light-emitting diodes (LEDs) 403 which are strobed. In one embodiment, LEDs 403 are strobed in synchronization with the image 401. In another embodiment, LEDs 403 are strobed when a tap is detected.

In this example implementation, as shown in FIG. 4, sensor apparatus 400 is implemented by attaching at least the sensor apparatus 400 to the bottom of a wrist of a user, arranged in a manner such that all of the fingertips of the user are within its field of view. As noted above in connection with FIG. 2, sensor apparatus 400 also can be implemented at other locations, such as by way of the sensor apparatus 301 (or special purposed camera) located at the bottom of a palm of a user.

Alternatively, the illumination system is optional and the special purpose camera may utilize ambient light to acquire the image. In this embodiment, visible light emitting diodes 403 are thus not incorporated in sensor apparatus 400. Optionally, the illumination system can still be included (e.g., by including visible light emitting diodes 403) but the visible light diodes 403 can be left turned off when the ambient light is sufficient to acquire the image of the finger combination. In this optional embodiment, image sensor 401 can be used to sense the ambient light level and processor 202 (FIG. 2) can be used to determine whether there is sufficient light and to control visible light-emitting diodes 403 by strobing them when necessary. In yet another embodiment, the sensor apparatus can be a stereoscopic camera. This embodiment is similar to the embodiments discussed above in connection with FIGS. 2-4, except that the sensor apparatus consists of two image sensors and two lenses, disposed relatively close to one another. When a tap is sensed, both image sensors simultaneously acquire images of the fingers at slightly different perspectives. In this embodiment the images captured by the image sensors are processed to determine landmarks in the two images to produce a single pseudo-three-dimensional image. This compound image is then further analyzed to determine which finger combination has been tapped as in the above embodiments.

Alternatively, the special purpose camera discussed above in connection with FIGS. 2-4 can be a time-of-flight type camera. In this embodiment, a single image sensor is used. In addition to capturing a two-dimensional image, the sensor apparatus (or special purpose camera) also records three-dimensional depth information. This compound image is further processed to determine which finger combination has been tapped.

In some example embodiments, one or more hardware components (e.g., components 201, 202, and/or 203 (FIG.

3), and/or components 301, 302, 303, 304 or 305 (FIG. 3) or 401, 402 and/or 403 (FIG. 4)) can be incorporated into another computing device. For instance, the components may be integrated into a smart watch, wearable glasses, another type of wearable device, or the like.

Alternatively, the components may be integrated into a desktop computer, laptop computer, tablet computer, or computer screen in which case the sensor apparatus can be, for example, of a form similar to that of the sensor apparatus 300 or 400 described above, but with at least the sensor apparatus and processor (e.g., processor 202) being housed in a device that is not worn by the user (e.g., a desktop, laptop, or tablet computer).

In yet another example embodiment, the sensing apparatus (e.g., component 201, 300, and/or 400) and processor (e.g., component 202) are not worn on the body of the user, but instead are remote from the user. For example, in a classroom or office, the sensor apparatus and processor may be installed in a centralized fixture, and tap data may be communicated by a transmitter (e.g., transmitter 203) in the centralized fixture to respective computing devices being operated by multiple users in the room. One example embodiment of such a system employs a stereoscopic camera and an IR illumination system, such as a scanning IR laser, that work together to capture images and determine the movements of users throughout the room.

Feature extraction software is then employed to identify within the field of view each user and their respective hand and finger locations. For example, after a user activates their respective computing device, the camera or imaging system of the centralized fixture identifies the finger positions of the user. Accuracy of the sensed finger positions can be enhanced by utilizing the IR illumination system. The fixture acquires the finger positions using the IR laser, and acquires images of each finger as it is illuminated by the laser. The processor of the fixture determines as each tap is performed whether each of the involved fingers is in contact with the surface when the tap is sensed, and then uses a mapping (e.g., as described in further detail below) to determine which character or command was input. A transmitter (e.g., component 203) of the fixture then transmits to the computing device of the associated user a message representing the appropriate character.

Figure 5:
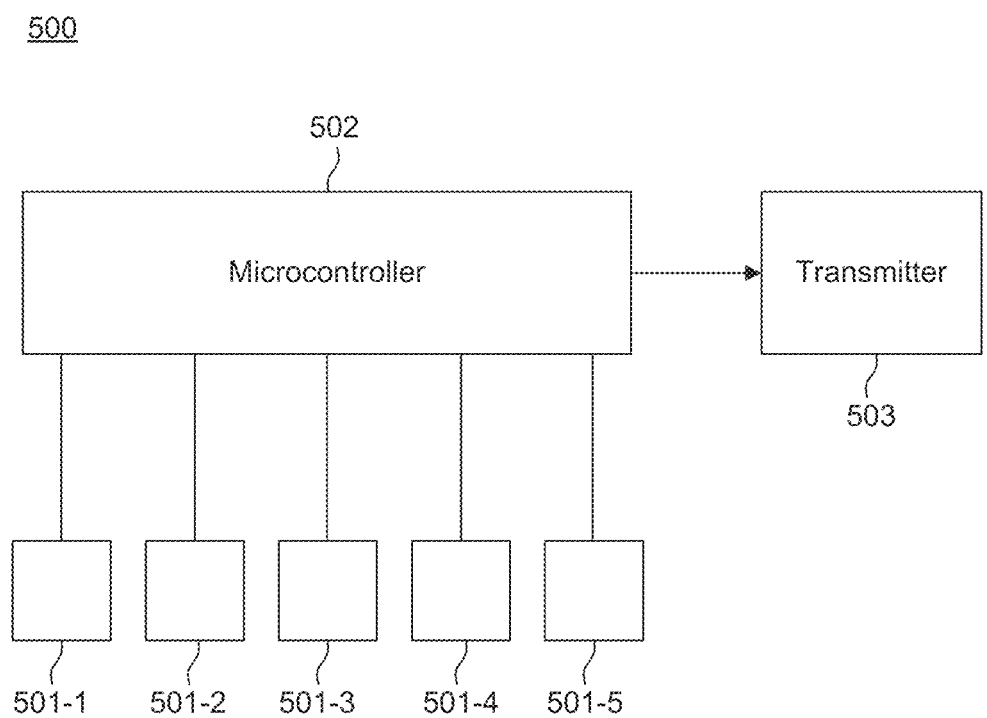
FIG. 5 illustrates another system that may be employed in accordance with example embodiments herein.

FIG. 5 illustrates another example system 500 that may be employed in accordance with example embodiments herein. This example embodiment employs mechanical sensors 501-1, 501-2, 501-3, 501-4, and 501-5 (collectively, 501), such as accelerometers, vibration sensors, tactile sensors, force sensors, pressure sensors, gyroscopes, and the like, to sense the mechanical quantities associated with corresponding fingers such as acceleration, vibration, force, pressure and the like. When, for example, a sudden change in mechanical quantity such as acceleration, vibration, force, pressure and the like, is sensed by any one or more of the sensors 501, a microcontroller 502 reads the output of the respective sensor(s) 501 and processes this information.

It should be understood that microcontroller 502 can include a processor such as the processor 202 discussed above with respect to FIG. 2. In addition, instead of using a microcontroller having input ports (e.g., analog-to-digital inputs ports), a processor in conjunction with similar peripheral integrated circuitry can be used (e.g., an analog-to-digital integrated circuit) and still be within the scope of the invention. Similarly, processor 202 discussed above in connection with FIG. 2 can be replaced with a microcontroller and still be within the scope of the invention.

In this embodiment, the sensors 501 are worn in such a way that each sensor 501 is in contact with a respective finger of a hand.

In this example embodiment, system 500 monitors the outputs of sensor 501. The beginning of a tap event, in this situation, is indicated by a change in output from any of the sensors 501 above a pre-determined threshold.

Once a tap event is sensed, microcontroller 502 reads data corresponding to each of the sensors 501 for a predetermined period of time (e.g. 60 ms), and analyzes the data to determine which of the fingers associated with the sensors 501 has made contact with a surface (resulting in a sensed finger combination). The microcontroller 502 then selects the character associated with the sensed finger combination and causes a transmitter 503 to transmit the character to a computing device.

In an example embodiment, microcontroller 502 sends the raw data from the sensors to a smartphone or other computing device, and the procedure of analyzing the raw data to determine which finger combination has been tapped may be performed within the smartphone or computing device.

Alternatively, the processor 502 extracts certain features from the raw data, such as peak amplitude, pulse width, rise time, time of arrival or (in the frequency domain) the power density for each of the sensors 501. Such feature information may be transmitted to a smartphone or other device with computing means. Further analysis of these features would then be performed within the smartphone or other computing means to determine the finger tap combination.

Figure 6:
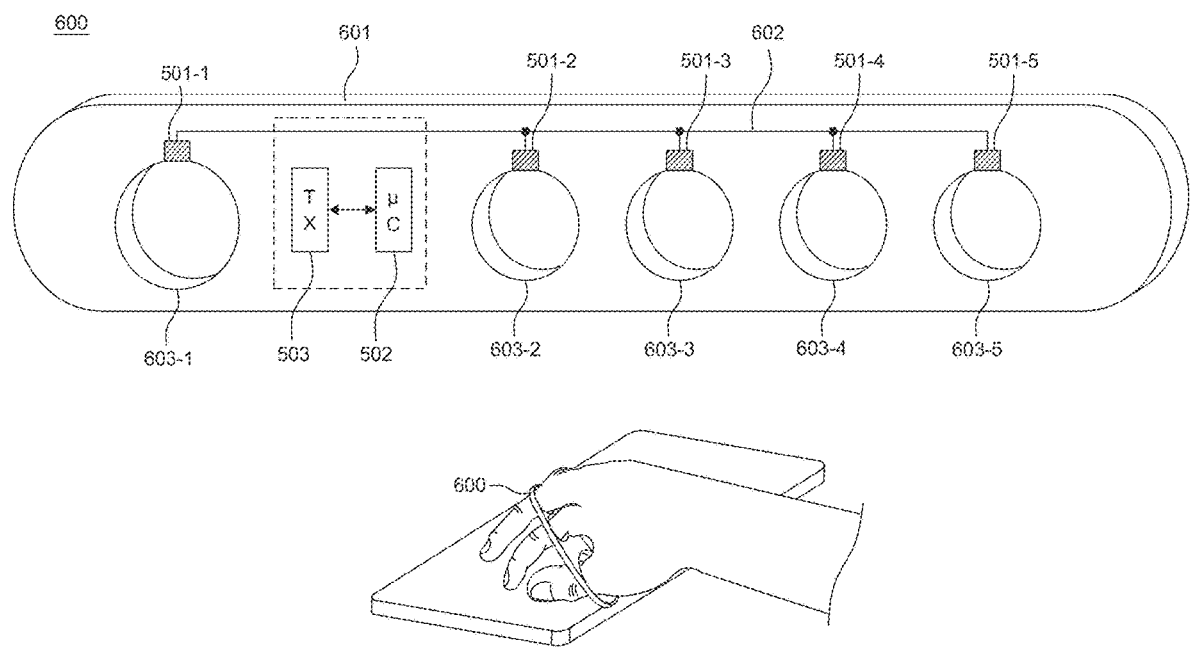
FIG. 6 illustrates an example mechanical sensor apparatus.

FIG. 6 illustrates an example sensor apparatus 600, which may further represent the sensor apparatus 500 that is described above in connection with FIG. 5. As shown in FIG. 6, mechanical sensors 501 (e.g., such as accelerometers, vibration sensors, tactile sensors, force sensors, pressure sensors, gyroscopes, and the like) are integrated inside the sensor apparatus 600, which in this example embodiment is in the form of a finger separator 601 that is flexible. The sensors 501 are located in the sensor apparatus 600 such that each sensor 501-1, 501-2, 501-3, 501-4, 501-5 is substantially in contact with a respective finger that is inserted within each finger hole 603-1, 603-2, 603-3, 603-4, 603-5 of finger separator 601 along the proximal phalanges (e.g., one sensor per proximal phalanx). Optionally, the sensor apparatus 600 can be constructed so as to house processor 502 and/or transmitter 503 as well, as shown in FIG. 6. Other components (e.g., power circuitry) can be integrated within the sensor apparatus 600 as well. The sensors 501 can be connected to the processor 502 via a bus placed within the structure of the finger separator 601. Alternatively, just the sensors 501 can be housed within the sensor apparatus 600 and connected via a connector (not shown) to the processor 502 and transmitter 503.

In yet another embodiment, just the sensors 501 and processor 502 can be housed (or encased) within the sensor apparatus 600 and connected to a remote transmitter 503 through a connector (not shown). It should be understood that the sensors 501 can be incorporated into a form factor other than the finger separator form factor shown in FIG. 6 and still be within the scope of the invention. Indeed, the form factor can be tailored to different ergonomics for different sizes and shapes of fingers and/or hands as will now be described.

This could be accomplished by incorporating the sensors 501 into a glove (or fingerless glove), so that each sensor 501 is in contact with one of the fingers along the phalanges. Alternatively, the sensors 501 could be worn across the back of the palm, so that the sensors 501 are in contact with the fingers along the metacarpal bones of each finger.

System 500 can be integrated into a variety of wearable structures. In another example embodiment, one or more system 500 components, for example, mechanical sensors 501, are incorporated into a flexible piece of fabric, such as a wearable wristband which can further be wrapped around the fingers or palm (fiducial marks), and operate in manners similar to those described in the context of the various example embodiments described elsewhere herein. The fabric may be comprised of elastic or another flexible material, in which the circuitry of the system 500 components is incorporated using flexible circuit technology. The fabric may be worn by the user by being wrapped around the user's hand, wrist, or other body part, which the user may move to cause particular characters to be transmitted or inputted to a computing device. In this embodiment, several mechanical sensors can be arranged within the layers of the material such that one or more mechanical sensors measures a mechanical quantity associated with a corresponding finger when the finger is tapped against a surface.

In another embodiment, the sensor apparatus 501 may be one or more acoustic sensors each of which senses the sound waves produced when each finger contacts the surface. In such a configuration, a single sensor or a multiplicity of sensors can be arranged to sense the acoustic signals produced by each tap. The processing means analyzes these signals to determine which of the fingers contributed to the acoustic signal in order to determine which finger combination was tapped.

In another embodiment, one or more EMG (electromyography) sensors may be employed. In this embodiment, sensors are in contact with the hand, wrist or arm of the user, and sense the electrical signals which are produced by the movement of the fingers and hand. Such a device may also employ a vibration sensor or accelerometer to sense a tap event. When a tap occurs the processor analyzes the signals from the EMG sensors to calculate the relative position of the fingers in order to determine which tap combination has been produced.

In another embodiment, Radio Frequency waves may be employed to determine the relative location of the fingers. In this embodiment, one or more RF sources produce a brief signal, and a multiplicity of sensors measures the pattern of reflection of such signal. By analyzing the reflection pattern, the location of the fingers is calculated and the tap combination is determined.

In another embodiment, processor 202 (FIG. 2) can be used instead of microcontroller 502 or conversely microcontroller 502 can be used instead of processor 202. Additionally, both systems 200 and 500 and their respective implementations can be combined. In this embodiment, placement of the camera-based sensor apparatus 201 and mechanical sensors 501 can be arranged as described herein.

Figure 7:
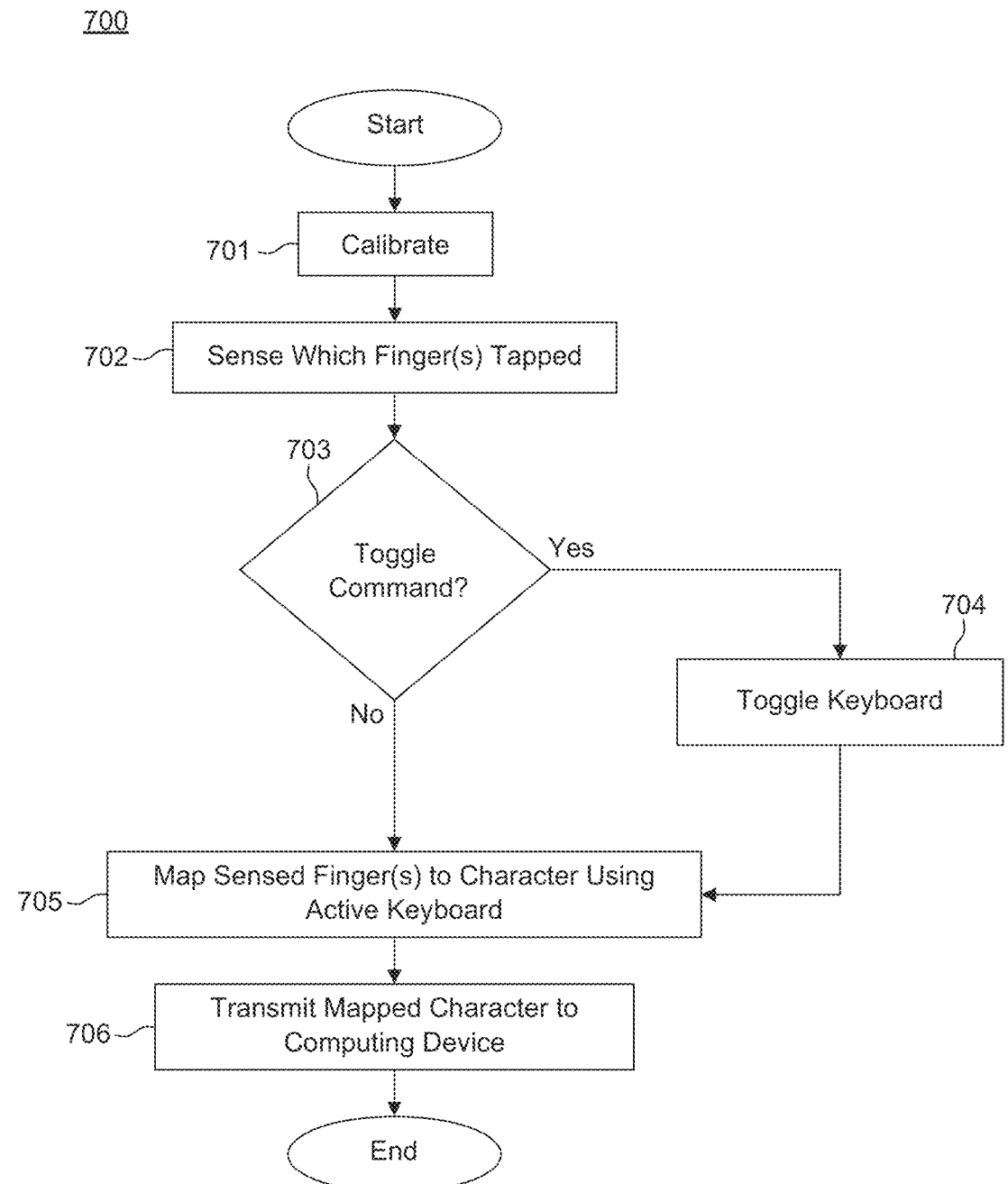
FIG. 7 is a flowchart illustrating an example procedure that may be employed according to various example embodiments herein.

Having described example systems that may be employed in accordance with various example aspects herein, reference will now be made to FIG. 7 to describe an example procedure 700 that may employ such systems.

At block 701, an optional calibration procedure is employed in order to speed and simplify processing, and to make the detection process more robust. To do this, a reference signal is first generated by tapping all of the fingers of a hand on a surface, enabling capture and processing of a corresponding reference signal. Since it is known that the reference tap is performed with all fingers in contact with the surface, the calibrated signal would serve as a reference signal that represents the signal produced by the sensor in a situation in which each of the fingers is in contact with the surface. The device can employ the reference signal as the basis for interpreting future taps, for instance by determining whether any given fingertip is present in any of the reference "down" positions.

The image sensor apparatus system 200 discussed above in connection with FIGS. 2-4 can be employed to acquire a reference signal. In instances where the sensor apparatus is as discussed above, the reference signal is an image which presents the position of each of the fingers when they are in the 'tap' position. This reference image can be compared to subsequently acquired images to determine which fingers are shown to be in the 'tap' position or the 'no tap' position.

The mechanical sensor apparatus system 500 discussed above in connection with FIGS. 5 and 6 can also be employed in a manner to acquire a reference signal. In such an embodiment, the signals acquired from the sensors from the reference 'tap' are analyzed and features are extracted from the sensors 501 of each finger which represent the signals produced when each of the fingers contacts the surface. This information can be compared with subsequent signals from subsequent tap events to distinguish which fingers have contacted the surface and which have not.

At block 702, a tap is sensed and a determination is made as to which finger combination was employed during the tap. In the camera implementation, when the tap occurs, an image (or sequence of images) of the fingers is acquired and stored in a memory. In the mechanical sensor embodiment, the forces of each mechanical sensor measurement is acquired and stored in a memory. A processor (e.g., processor 202 or 502) then executes a series of filter algorithms on the acquired images to ascertain the locations of the fingertips during the tap. For example, the processor may first execute an edge detection algorithm, such as a Canny Filter, on the acquired image. The result of such a procedure may include a table of pixel locations of the lowest part of each fingertip within the image.

At block 703 a determination is made (e.g., by processor 202 or 502) based on the sensed finger combination and the mapping provided by the presently active keyboard, whether the sensed finger combination corresponds to a toggle command. If the processor determines that the sensed finger combination does not correspond to the toggle command, then control is passed to block 705. If, on the other hand, a determination is made in block 703 that the sensed finger combination does correspond to the toggle command, then at block 704 the processor toggles the keyboard, activating either the default keyboard or the alternate keyboard based on which one of the keyboards is presently active. Control is then passed to block 705. [0079] Once a determination has been made as to which fingers were in contact with the surface during the tap, the character corresponding to that finger combination is calculated based on a look-up table. In particular, at block 705, the mapping provided by the active keyboard (e.g., the default keyboard or the alternate keyboard, as shown for example in Table 1 (below), which in some example embodiments is pre-stored in memory) is employed to map the sensed finger combination to a corresponding character (a mapped or decoded character).

At block 706, the processor causes the transmitter to transmit the mapped or decoded character to the computing device (e.g., a mobile or desktop computing device) by way of a wired or wireless interface. At that point, the system can optionally return to the low-power mode until a next tap event is detected.

Figure 8:
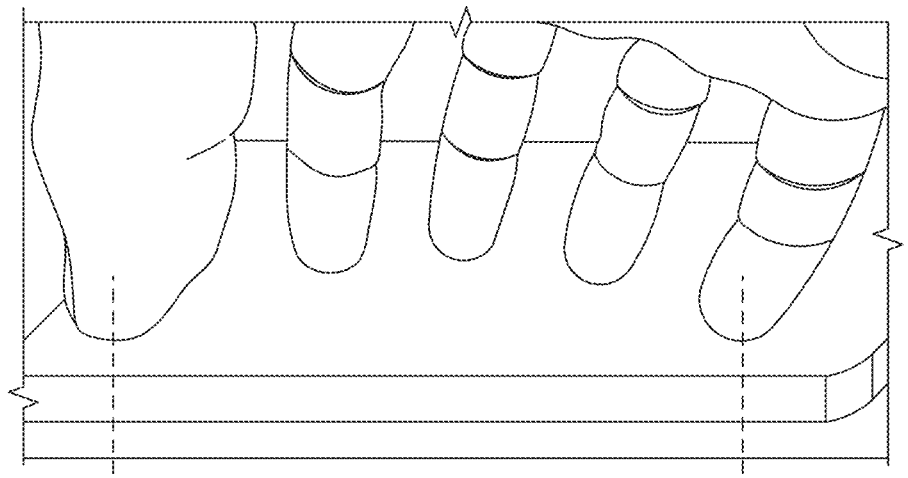
FIG. 8 illustrates an example of an acquired image and a corresponding edge-detected image in accordance with various example aspects herein.
Figure 8:
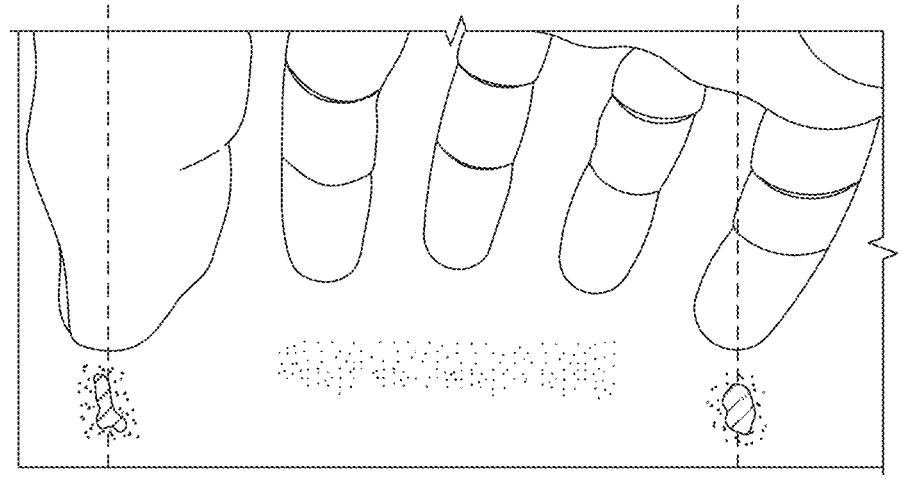

FIG. 8 illustrates an example acquired image 801 and a corresponding edge-detected image 802 that may result from executing the above-described procedure. The processor applies a feature extraction algorithm, such as a Hough Transform, to the edge-detected image in order to identify the finger combination of the tap. The fingertips, in one example, are modeled as simple circles (or semi-circles) for the Hough Transform. In this manner, the feature extraction process is simplified because of the a priori knowledge of the morphology of the hand, i.e., that there are five fingers, and that the fingers are arranged vertically throughout the image.

Using the five fingers of one hand, a user can tap 31 unique finger combinations. These finger combinations are mapped to standard ASCII characters. For example, in the English language, the 31 finger combinations would suffice to represent the 26 letters of the alphabet, and the five remaining combinations could be used to represent common "control" characters, such as SHIFT, RETURN, and BACK-SPACE. As described below, one of the finger combinations would represent a "toggle" command, which would enable an alternate character set or sets. These alternate character sets can contain additional characters such as numbers, punctuation and other ASCII characters.

As described above, the processor need not determine which of the fingertips were in contact with the surface (i.e., perform the algorithm that maps the finger combinations to standard ASCII characters) and instead can cause the raw data to be transmitted to a computing device that is communicatively coupled with the processor (e.g., processor 202 or 502) through, for example, a transmitter (e.g., 203 or 503). This would allow for example for the processing device of the computing device (e.g., in a smartphone or other computing device) to determine which of the fingertips were in contact with a surface during the tap, and which were not.

Table 1 shows an example of how the printable ASCII characters and common control characters could be mapped into finger tap combinations. In particular, Table 1 shows which default keyboard character and which alternate keyboard character corresponds to each finger combination. Finger combinations are identified in the chart by a string of five characters corresponding to the five fingers, respectively, of a user's hand. For instance, the left-most one of the five characters may correspond to a user's thumb on their right hand or the user's pinky on their left hand, and so on. The right-most one of the five characters may correspond to a user's pinky on their right hand or their thumb on their left hand, and so on. In each finger combination an X represents a finger that is involved in a tap, and an O represents a finger that is not involved in the tap, thereby forming a binary number that can be mapped to different characters.

TABLE 1

CHARACTER MAP EXAMPLE

| FINGER COMBO. | DEFAULT KEYBOARD | | ALTERNATE KEYBOARD | |
|---|---|---|---|---|
| | No Shift | Shift | No Shift | Shift |
| 1 XOOOO | a | A | 1 | |
| 2 OXOOO | e | E | 2 | |
| 3 XXOOO | n | N | 6 | |
| 4 OOXOO | i | I | 3 | |
| 5 XOXOO | s | S | ? | |
| 6 OXXOO | t | T | 7 | |
| 7 XXXOO | SHIFT | SHIFT | SHIFT | |
| 8 OOOXO | o | O | 4 | |
| 9 XOOXO | k | K | , | |

TABLE 1-continued

CHARACTER MAP EXAMPLE

| FINGER COMBO. | DEFAULT KEYBOARD | | ALTERNATE KEYBOARD | |
|---|---|---|---|---|
| | No Shift | Shift | No Shift | Shift |
| 10 OXOXO | m | M | ( | ) |
| 11 XXOXO | j | J | - | |
| 12 OOXXO | l | L | 8 | |
| 13 XOXXO | x | X | / | \ |
| 14 OXXXO | DELETE | DELETE | DELETE | |
| 15 XXXXO | r | R | . | |
| 16 OOOOX | u | U | 5 | |
| 17 XOOOX | y | Y | ' | " |
| 18 OXOOX | g | G | : | |
| 19 XXOOX | b | B | ! | |
| 20 OOXOX | f | F | < | > |
| 21 XOXOX | w | W | # | * |
| 22 OXXOX | q | Q | + | = |
| 23 XXXOX | z | Z | ^ | ~ |
| 24 OOOXX | d | D | 9 | |
| 25 XOOXX | c | C | $ | % |
| 26 OXOXX | p | P | @ | & |
| 27 XXOXX | v | V | [ | ] |
| 28 OOXXX | TOGGLE | TOGGLE | TOGGLE | |
| 29 XOXXX | RETURN | RETURN | RETURN | |
| 30 OXXXX | h | H | 0 | |
| 31 XXXXX | SPACE | SPACE | SPACE | |

For convenience, the following example is provided in a case where a user's right hand is being employed for taps. At the start, a default keyboard (or character set) is active. As one example, to tap the letter "a," the user may momentarily tap their thumb on a surface, in which case a sensor apparatus determines that the thumb had been in contact with the surface at the moment of the tap, and the letter "a" is transmitted to the computing device. To tap a capital "A," the user would first tap with their thumb, first, and middle fingers simultaneously on a surface. This would be interpreted by the sensor apparatus and/or processor as the "SHIFT" command. Then, the user would tap the "A" as before, with their thumb.

As mentioned above, to activate an alternate keyboard, for instance to facilitate selection of a special character, the user would first tap the "TOGGLE" command, using the middle, ring and pinky fingers. This would activate the alternate keyboard. The user could then tap the finger combination that corresponds to the number or character desired. Note that by using the TOGGLE command in conjunction with other combinations, any number of alternative keyboards can be selected.

In one example embodiment herein, to increase the ease and speed by which a user can be trained to employ a particular mapping of finger combinations to characters, finger combinations can be categorized into finger sets, or categories of finger combinations that share similar characteristics. For instance, Table 2 shows example categories or finger sets.

TABLE 2

| Finger Set (Number of possible combinations) | Possible Finger Combinations |
|---|---|
| All Fingers Down (1) | XXXXX |
| One Finger Down (5) | X0000 |
| | 0X000 |
| | 00X00 |
| | 000X0 |
| | 0000X |

TABLE 2-continued

| Finger Set (Number of possible combinations) | Possible Finger Combinations |
|---|---|
| One Finger Up (5) | 0XXXX |
| | X0XXX |
| | XX0XX |
| | XXX0X |
| | XXXX0 |
| Two Fingers, Together (4) | XX000 |
| | 0XX00 |
| | 00XX0 |
| | 000XX |
| Two Fingers, Skip One (3) | X0X00 |
| | 0X0X0 |
| | 00X0X |
| Two Fingers, Far Apart (3) | X000X |
| | X00X0 |
| | 0X00X |
| Three Fingers Together (3) | XXX00 |
| | 0XXX0 |
| | 00XXX |
| Three Fingers, Skip Two and Two Skips (3) | X00XX |
| | XX00X |
| | X0X0X |
| Three Fingers, Skip One (4) | X0XX0 (Thumb Down, First Up) |
| | XX0X0 (Thumb Down, Middle Down) |
| | 0X0XX (Pinky Down, Middle Down) |
| | 0XX0X (Pinky Down, Ring Up) |

By grouping finger combinations into sets, and then mapping a finger set to characters that share a common characteristic, a user may find it easier to learn to use the mapping for character entry. For example, there are five finger combinations possible in the set referred to as "one finger down." Those five finger combinations may be mapped to the five vowels of the English alphabet (i.e., a, e, i, o, and u), thereby making it easier for a user to employ such a mapping.

In another example, which is available to all the embodiments described herein, the sensor apparatus and/or other components are incorporated into a wearable device, and are configured to sense user motion in addition to finger taps. In response to such sensing, the wearable device may facilitate screen-navigation functions on a screen that is either incorporated into the wearable device or separate from the wearable device. In this manner, the device may utilize the sensed hand motions to control the location of a cursor on a computer screen, thus emulating the function of a mouse. In this situation, certain finger combinations can be mapped to common mouse commands (e.g. right click, left click).

The connectivity to a separate device can be according to Human Interface Device Profile (HID), which defines the protocols, procedures and features to be used by Bluetooth HID enabled devices such as keyboards, pointing devices, gaming devices and remote monitoring devices.

Alternatively, and/or additionally, the sensor apparatus within the wearable device can be configured to interpret gestures as well as taps. In this case, the device may be used to manipulate objects on a screen or send commands to a computing device.

It should also be understood that the number of fingers required to map to a finger combination can be fewer than five. This embodiment would be useful, for example, in the case where a user's hand has fewer than five fingers due to, for example, an injury or disability.

Low Power Mode

Figure 9:
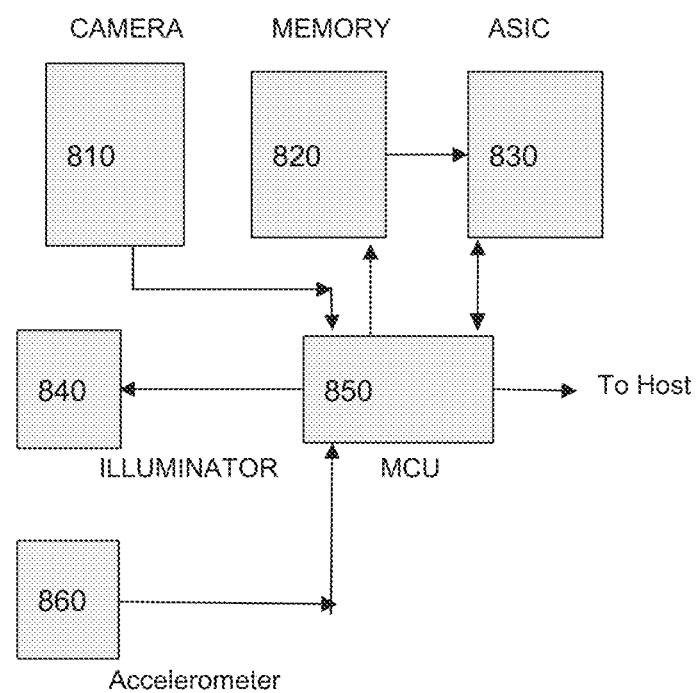
FIG. 9 illustrates an example of a system having a low power mode.

An example embodiment of a system having a low power mode will be described with respect to FIG. 9 and FIG. 10. As shown in FIG. 9, in this example embodiment the imaging system consists of a camera 810 (for example, a near IR sensitive camera with a wide angle lens) and an illuminator 840 (for example, a structured light projector which projects a random pattern of IR dots). The imaging system is mounted on the wrist in such a manner so that the fingers of the hand are in the field of view of the camera. An accelerometer 860 (as an example of a preferred mechanical sensor) is mounted on the wrist. The camera is connected to a memory 820 (for example, a fast memory buffer), and is controlled by a low-power microcomputer unit (MCU) 850, which is also in communication with the accelerometer 860. The system also includes an ASIC 830, which is capable of performing depth map extraction from structured light illuminated images. The ASIC 830 also performs some additional image processing tasks as is required by the detection algorithm, and the MCU 850 has the ability to signal the ASIC 830 to switch to and from a low-power sleep state and to a high-power operational state. The MCU 850 also has a wireless data link through which it can communicate with a host device.

The system of this example operates in four modes:
1. Wait for Tap (default mode):
    a. MCU is active—monitoring the accelerometer for a tap event
    b. Camera is active, buffering N image frames in memory
    c. Illuminator is strobed in sync with the camera integration time
    d. ASIC is in sleep mode (i.e., a low power mode)
2. Data Extraction (starts when a tap event is detected using the accelerometer)
    a. Camera captures M additional image frames
    b. ASIC is woken up by the MCU, extracts depth maps (and may perform other image processing tasks) from the N images before and the M images after the tap event
3. Tap Classification and Transmission (starts when ASIC completes depth processing):
    a. Camera in sleep mode
    b. ASIC in sleep mode
    c. MCU determines the tap combination and transmits to host
4. No Tap Allowed (starts after transmission is complete)
    a. All operation stops until No Tap period is over Description of Operation of Example Embodiment With Low Power Mode In the Wait for Tap state, the MCU 850 continuously reads the output of the Accelerometer 860. The camera is in a free-running mode in which it continuously takes images at a predetermined frame rate, and stores the images in a circular buffer (FIFO), so that when the buffer is filled, the oldest frame taken is discarded and the newest frame is added to the buffer. The scene is illuminated by strobes from the structured light projector, controlled by the MCU 850. The ASIC 830 is in a sleep state and draws little or no current.

When the signals from the accelerometer indicate that a tap event has occurred, the system enters the Data Extraction state. The accelerometer (or another mechanical sensor) can be used in various ways to detect the occurrence of a tap event. For example, an acceleration followed by a sudden deceleration (when a finger strikes a surface and stops) may be used to detect a tap event. The camera continues to capture one or more frames after the tap event is detected. In this example embodiment, control is performed so that there will be N frames (for example, 3 frames) stored in memory prior to the tap event, and M frames (for example, 3 frames) stored in memory after the tap event. After recording these additional M frames following detection of a tap event, the camera will go to sleep. The MCU 50 will wake up the ASIC 30, which will fetch the frames from memory and extract the depth maps from each, sending the results to the MCU 50. In this example embodiment, all N+M frames stored in memory will be used in performing analysis to determine which fingers were involved in the tap event. However, those skilled in the art will appreciate that the number N and the number M can be varied, and will also appreciate that it is not necessary to use all frames stored in the memory but instead a subset of the N+M frames can be used for analysis. For example, it is possible to buffer only one frame before and one frame after the tap is detected, or to buffer more frames but use only one frame before and one frame after the tap for performing image analysis. It is also possible to buffer and/or analyze only a single total frame.

The system then enters the Tap Classification and Transmission state, in which the MCU 850 places the ASIC 830 into a sleep state, classifies the tap data—determining which of the fingers were involved in the tap event—and sends information to the host processor.

The system then enters the No Tap Allowed state, in which the entire system enters a sleep state for a predetermined period of time. For example, the shortest practical interval between two taps by a user can be considered to be 100 ms, and the time that it takes to extract the data, classify the tap and transmit information to the host system may be 50 ms. With those parameters, the system will then not 'look' for the next tap event for an additional 50 ms, since it is not expected that another tap can be performed in such a short interval. When the 50 ms period is over, the system returns to the Wait for Tap state.

Figure 10:
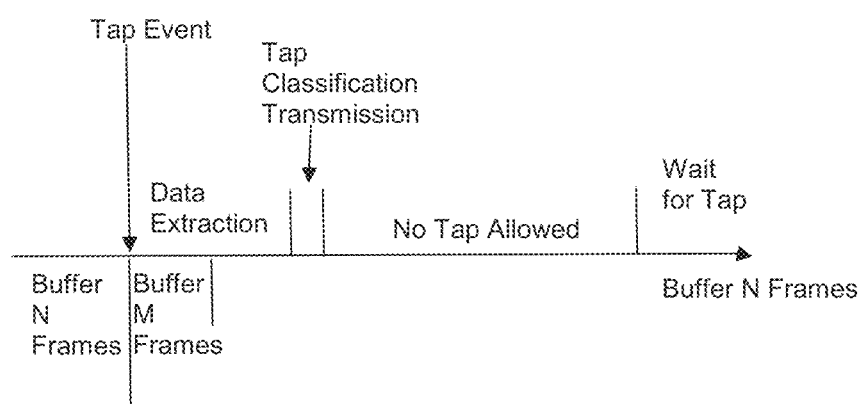
FIG. 10 illustrates an example of timing for a processor to be in a low power mode.

One example of timing that may be used in this example embodiment can be understood with respect to FIG. 10. In FIG. 10, the system is initially in the Wait for Tap state, and the camera continuously captures images frames and stores them in a buffer that is capable of storing, for example, 10 frames. When a tap event is detected, the system shifts to the Data Extraction state in which the ASIC 830 is in an operational state. This state may last, for example, about 20 ms. After the ASIC 830 completes the depth processing, the system shifts to the Tap Classification and Transmission state, and the ASIC 830 is placed back into a sleep state. The combined Data Extraction state and Tap Classification and Transmission state may last, for example, about 50 ms. After information is transmitted to the host device, the system shifts to the No Tap Allowed state. In this example, that No Tap Allowed state lasts 50 ms. Then the system returns to the Wait for Tap state.

Although it is mentioned above that the shortest practical time between taps is 100 ms, in actuality a typical user will tap with intervals of 200 ms or more between tap events. Thus, in this example, the ASIC 830 will be in the operational state for 20 ms out of 200 ms, or for a 10% duty cycle. Even if the ASIC 830 requires 1 W of power when in the operational state, with a duty cycle of 10% the ASIC 830 would only require, on average, about 100 mW of power. (It would require only a few mW in the sleep state.) Hence, by utilizing a mechanical sensor to detect when a tap event occurs and having the ASIC 830 in an operational state to perform complex image processing only when it is necessary, with the ASIC 830 being placed in a low power mode at other times, it is possible to have a wearable tap device that can perform complex image processing, thereby increasing the accuracy of the device, while having power and heat dissipation characteristics that are practical for a wearable device that can be used for an extended period without recharging.

It should be understood that other embodiments may utilize other methods in each part of the invention. For example, rather than depth map extraction, the system may use other computationally intensive techniques to improve the detection accuracy of the system. For example, the ASIC may be used to implement a pixel-based machine learning algorithm. Alternatively, other methods may be used to extract depth information. In addition, it is possible that the MCU functions can be incorporated in the ASIC, and that the ASIC will then selectively place functional blocks of circuitry within the ASIC into a sleep mode as appropriate.

Figure 11:
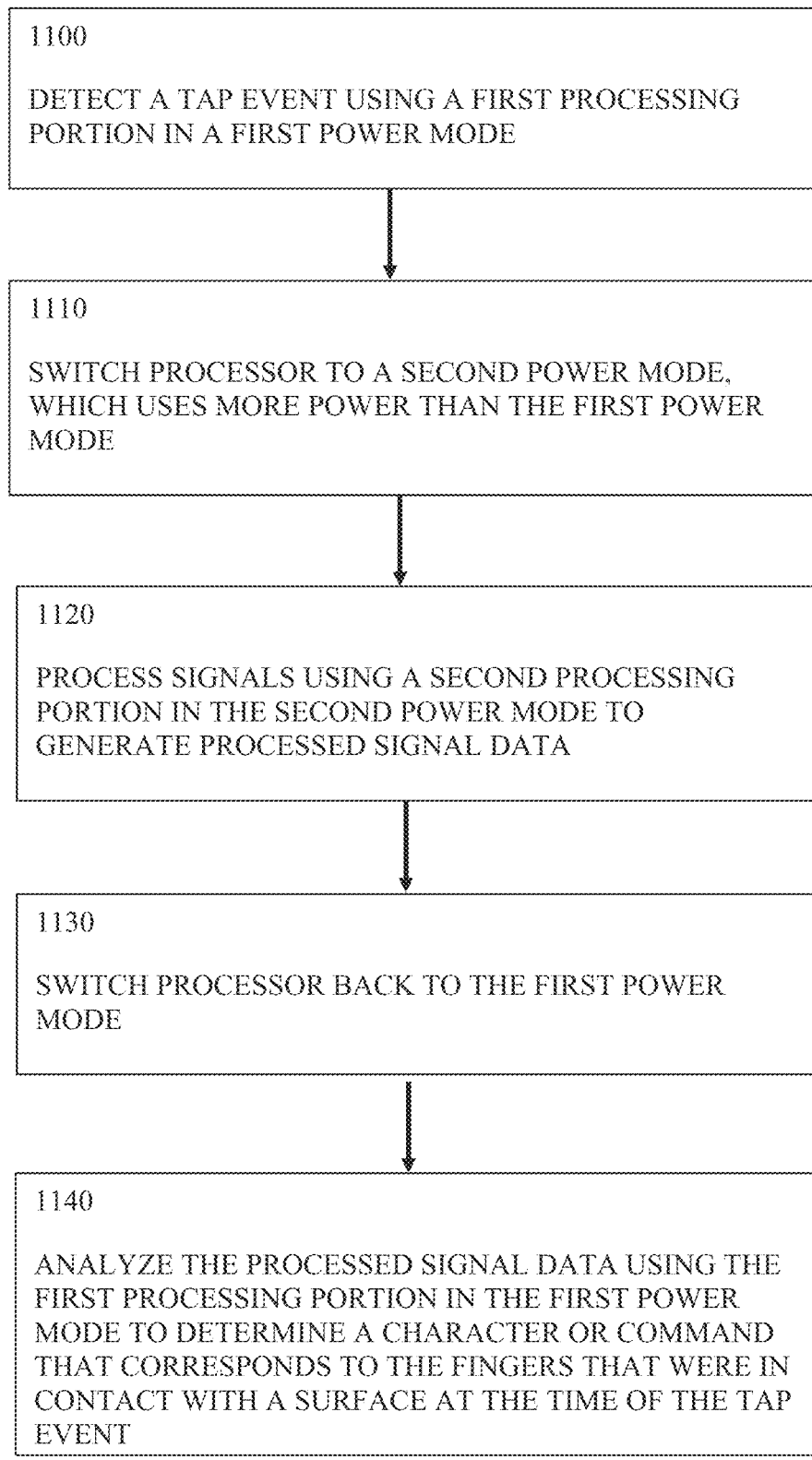
FIG. 11 illustrates a flow diagram of an example method for controlling a tap device having a low-power mode.

FIG. 11 illustrates the high-level flow of one example embodiment of a method of controlling a wearable tap device having two power modes. In S1100, a tap event is detected using a first processing portion of a processor in a first power mode. As discussed above, the first processing portion may be, for example, functional blocks of a circuit that perform functions in the first power mode (e.g., a low-power mode) while other functional blocks that require more power are in a sleep mode (or otherwise set to be inactive or to use little or no power), or the first processing portion may be, for example, a separate circuit such as an MCU. The first processing portion detects as a tap event a signal from at least one mechanical sensor that exceeds a predetermined threshold, or otherwise has a value that indicates a finger of a user has made contact against a surface.

In S1110, when a tap event is detected, the processor is switched to a second power mode so that a second processing portion of the processor, which requires more power than the first processing portion, can perform its function or functions. As discussed above, the second processing portion may be other functional blocks of the processor, which were previously in a sleep mode or inactive state, or it could be, for example, a separate circuit such as an ASIC.

In S1120, the second processing portion performs processing of signals from one or more sensors of the tap device to generate processed signal data. This is computationally-intensive processing that requires more power than the functions performed by the first processing portion and permits greater accuracy in detecting which fingers have contacted the surface at the time of the tap event. For example, this processing may be three-dimensional processing of one or more images captured by an image sensor, and more specifically may be processing to extract depth information from one or more images. As discussed above, the system may capture one image from an image sensor that is processed by the second processing portion, or the system may buffer plural images in a memory. For example, according to an example embodiment discussed above, a first predetermined number of images N may be buffered in the memory prior to the tap even, and a second predetermined number of image M may be captured and stored in memory after the tap event. The second processing portion can process all of the first predetermined number of images N and the second predetermined number of images M, or in alternative embodiments it may process only a subset of those images (or, as just mentioned, only a single image).

In S1130, the processor is switched back to the first power mode. That is, the second processing portion (or the ASIC, for example, if separate circuits are used for the first and second processing portions) is switched to the sleep mode or inactive state, and only the first processing portion (or the MCU, for example, if separate circuits are used) is active in a low-power mode.

In S1140, the first processing portion (or the MCU, for example, if separate circuits are used) analyzes the processed signal data (for example, extracted depth information) to determine which fingers were in contact with the surface at the time of the tap event and/or to determine a character or command corresponding to the fingers that were in contact with the surface at the time of the tap event. Or, in the case mentioned above where the second processing portion (or ASIC) not only performs processing to extract the locations of fingers but also performs additional processing as required by the detection algorithm (for example, to detect which fingers were in contact with the surface at the time of the tap event), the first processing portion (or MCU) determines a command or character corresponding to the fingers that were in contact with the surface at the time of the tap event (for example, using a look-up table).

Software embodiments of the example embodiments presented herein may be provided as a computer program product, or software, that may include an article of manufacture on a machine accessible or machine readable medium having instructions. The instructions on the non-transitory machine accessible machine readable or computer-readable medium may be used to program a computer system or other electronic device. The machine or computer-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "computer-readable", "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further includes software for performing example aspects of the invention, as described above.

Included in the programming and/or software of the general and/or special purpose computer or microprocessor are software modules for implementing the procedures described above.

While various example embodiments have been described above, it should be understood that they have been presented by way of example, and not limitation. It is apparent to persons skilled in the relevant art(s) that various changes in form and detail can be made therein. Thus, the invention should not be limited by any of the above described example embodiments. Also, as used herein, the singular forms "a," "an," and "the," are intended to include the plural forms as well, unless the context clearly indicates otherwise.

In addition, it should be understood that the figures are presented for example purposes only. The architecture of the example embodiments presented herein is sufficiently flexible and configurable, such that it may be utilized and navigated in ways other than that shown in the accompanying figures.

We claim:

1. A method of controlling a wearable tap detection system having a processor and a plurality of sensors for detecting contact by one or more fingers against a surface that is separate from the wearable tap detection system, including at least one mechanical sensor, the method comprising:
   detecting, as a tap event, a signal from the at least one mechanical sensor that exceeds a predetermined threshold;
   when the tap event is detected, switching the processor from a first power mode to a second power mode, the second power mode using more power than the first power mode;
   performing, using the processor in the second power mode, processing of one or more signals from the plurality of sensors to generate processed signal data;
   switching the processor from the second power mode to the first power mode, after the processed signal data is generated; and
   performing, using the processor in the first power mode, analysis of the processed signal data to determine one of a character or a command that corresponds to the fingers that contacted the surface at the time of the tap event.

2. The method according to claim 1, wherein the processor has a first portion that functions at least in the first power mode and a second portion that functions only in the second power mode, wherein the first portion performs (i) the detecting the tap event, (ii) the switching the processor from the first power mode to the second power mode, and (iii) the analysis of the processed signal data, and wherein the second portion performs the processing to generate the processed signal data.

3. The method according to claim 1, wherein the plurality of sensors includes an image sensor, and wherein the processing performed in the second power mode to generate the processed signal data is performed on one or more images captured by the image sensor.

4. The method according to claim 3, wherein the processing performed in the second power mode is processing to extract depth map information as the processed signal data.

5. The method according to claim 3, wherein the wearable tap detection system includes a memory, and wherein the method further comprises buffering a first predetermined number of images captured by the image sensor before the tap event and buffering a second predetermined number of image captured by the image sensor after the tap event.

6. The method according to claim 5, wherein the processing performed in the second power mode is performed on a subset of the images buffered before the tap event and the images buffered after the tap event.

7. The method according to claim 3, wherein the wearable tap detection system further includes an illumination source, and wherein the method further comprises controlling the illumination source to illuminate the fingers while the image sensor is capturing images.

8. The method according to claim 1, wherein the processing performed in the second power mode includes processing using a machine learning algorithm.

9. The method according to claim 1, wherein the plurality of sensors includes one or more EMG (electromyography) sensors, and wherein the processing performed in the second power mode includes processing of one or more signals from the one or more EMG sensors.

10. The method according to claim 1, wherein the processing performed in the second power mode includes determining which fingers were in contact with the surface at the time of the tap event and the processed signal data includes information indicating which fingers were in contact with the surface at the time of the tap event, and
wherein the analysis of the processed signal data performed in the first power mode includes using a look-up table to determine one of a character or a command that corresponds to the fingers that contacted the surface at the time of the tap event.

11. The method according to claim 1, wherein the processing performed in the first power mode includes analysis of the processed signal data to determine which fingers were in contact with the surface at the time of the tap event.

12. A tap detection system wearable by a user, comprising:
a processor having a first processing portion configured to function in at least a first power mode and a second processing portion configured to function only in a second power mode that uses more power than the first power mode; and
a plurality of sensors including at least one mechanical sensor, configured to detect contact by one or more fingers of the user with a surface that is separate from the wearable tap detection system,
wherein the first processing portion is configured, when operating in the first power mode, to
detect, as a tap event, a signal from the at least one mechanical sensor that exceeds a predetermined threshold, and
switch the processor, when the tap event is detected, from the first power mode to the second power mode,
wherein the second processing portion is configured to process one or more signals from the plurality of sensors to generate processed signal data, and
wherein the processor is configured to return to the first power mode after the processed signal data is generated and to analyze the processed signal data, using the first processing portion, to determine one of a character or a command that corresponds to the fingers that contacted the surface at the time of the tap event.

13. The wearable tap detection system according to claim 12, wherein the plurality of sensors includes an image sensor, and wherein the second processing portion processes one or more images captured by the image sensor to generate the processed signal data.

14. The wearable tap detection system according to claim 13, wherein the second processing portion processes the one or more images to extract depth map information as the processed signal data.

15. The wearable tap detection system according to claim 13, further comprising a memory, wherein the first processing portion is further configured to control the memory to buffer a first predetermined number of images captured by the image sensor before the tap event and to buffer a second predetermined number of image captured by the image sensor after the tap event.

16. The wearable tap detection system according to claim 15, wherein the second processing portion performs processing on a subset of the images buffered before the tap event and the images buffered after the tap event.

17. The wearable tap detection system according to claim 13, further comprising an illumination source, wherein first processing portion is further configured to control the illumination source to illuminate the fingers while the image sensor is capturing images.

18. The wearable tap detection system according to claim 12, wherein the second processing portion performs processing using a machine learning algorithm.

19. The wearable tap detection system according to claim 12, wherein the plurality of sensors includes one or more EMG (electromyography) sensors, and wherein the second processing portion performs processing using one or more signals from the one or more EMG sensors.

20. The wearable tap detection system according to claim 12, wherein the processing performed by the second processing portion includes determining which fingers were in contact with the surface at the time of the tap event and the processed signal data includes information indicating which fingers were in contact with the surface at the time of the tap event, and
wherein the processing performed using the first processing portion includes using a look-up table to determine one of a character or a command that corresponds to the fingers that contacted the surface at the time of the tap event.

21. A wearable tap detection system comprising:
an image sensor;
at least one mechanical sensor that detects contact by one or more fingers against a surface;
a microcomputer unit (MCU); and
an application specific integrated circuit (ASIC) having a sleep mode and an active mode, wherein in the active mode the ASIC uses more power than the MCU,
wherein in a first operating mode:
the ASIC is in the sleep mode; and
the MCU monitors the at least one mechanical sensor to detect a tap event, the tap event occurring when a signal from the at least one mechanical sensor exceeds a predetermined threshold, wherein, when the MCU detects a tap event, the wearable tap detection system changes to a second operating mode in which:

the MCU causes the ASIC to shift from the sleep mode to the active mode; and the ASIC performs processing on at least one image captured by the image sensor to generate processed signal data, and wherein, after the ASIC generates the processed signal data, the wearable tap detection system changes to a third operating mode in which:

the ASIC returns to the sleep mode; and the MCU analyzes the processed signal data to determine one of a character or a command that corresponds to the fingers that contacted the surface at the time of the tap event.

22. A wearable tap detection system according to claim 21, wherein the ASIC generates the processed signal data by processing the at least one image to extract depth map information.

23. A wearable tap detection system according to claim 22, further comprising a memory, wherein the MCU controls the image sensor to continuously capture images in the first operating mode and controls the memory to buffer a first predetermined number of images captured by the image sensor in the first operating mode, wherein the MCU controls the image sensor to capture a second predetermined number of images after detecting the tap event, and wherein the ASIC processes one or more images from among the first predetermined number of images buffered before the tap event and the second predetermined number of images captured after the tap event.

24. A wearable tap detection system according to claim 23, wherein in the third operating mode the image sensor is controlled to be in a sleep mode.

25. A wearable tap detection system according to claim 23, further comprising an illumination source, wherein the MCU controls the illumination source to illuminate the fingers when the image sensor is capturing images.

26. A method of controlling a wearable tap detection system comprising an image sensor, at least one mechanical sensor that detects contact by one or more fingers against a surface, a microcomputer unit (MCU), and an application specific integrated circuit (ASIC) having a sleep mode and an active mode, wherein in the active mode the ASIC uses more power than the MCU, the method comprising:

monitoring the at least one mechanical sensor, using the MCU, to detect as a tap event a signal from the at least one mechanical sensor that exceeds a predetermined threshold;

buffering a predetermined number of images captured by the image sensor;

when the MCU detects a tap event, switching the ASIC from the sleep mode to the active mode;

after switching the ASIC to the active mode, processing one or more images captured by the image sensor using the ASIC to generate processed signal data;

switching the ASIC to the sleep mode, after the processed signal data is generated; and analyzing the processed signal data using the MCU to determine which fingers contacted the surface at the time of the tap event.

27. The method according to claim 26, wherein the ASIC processes the one or more images using three-dimensional image processing to generate the processed signal data.

28. The method according to claim 27, wherein the ASIC extracts depth information from the one or more images to generate the processed signal data.

29. The method according to claim 26, further comprising:

capturing a predetermined number of images after the MCU detects a tap event, wherein the ASIC processes one or more images from among the predetermined number of images buffered before the tap event and the predetermined number of images captured after the tap event.

30. A wearable tap detection system comprising:

a plurality of sensors including at least one mechanical sensor that detects contact by one or more fingers against a surface;

a microcomputer unit (MCU); and an application specific integrated circuit (ASIC) having a sleep mode and an active mode, wherein in the active mode the ASIC uses more power than the MCU, wherein in a first operating mode:

the ASIC is in the sleep mode; and the MCU monitors the at least one mechanical sensor to detect a tap event, the tap event occurring when a signal from the at least one mechanical sensor exceeds a predetermined threshold, wherein, when the MCU detects a tap event, the wearable tap detection system changes to a second operating mode in which:

the MCU causes the ASIC to shift from the sleep mode to the active mode; and the ASIC performs processing on one or more signals from the plurality of sensors to detect which fingers were in contact with the surface at the time of the tap event, and wherein, after the ASIC detects which fingers were in contact with the surface, the wearable tap detection system changes to a third operating mode in which: the ASIC returns to the sleep mode.

31. The wearable tap detection system according to claim 30, wherein in the third operating mode, information related to which fingers were in contact with the surface at the time of the tap event is transmitted to an external device.

32. The wearable tap detection system according to claim 30, wherein the plurality of sensors includes an image sensor, and wherein in the second operating mode the ASIC performs processing on one or more images captured by the image sensor to extract information about the locations of the fingers at the time of the tap event and performs analysis of the extracted information to detect which fingers were in contact with the surface at the time of the tap event.

* * * * *